United States Patent
Ogle et al.

(10) Patent No.: US 10,602,198 B2
(45) Date of Patent: *Mar. 24, 2020

(54) SET-TOP BOX WITH INTERACTIVE PORTAL AND SYSTEM AND METHOD FOR USE OF SAME

(71) Applicant: Enseo, Inc., Richardson, TX (US)

(72) Inventors: Vanessa Ogle, Fairview, TX (US); Thomas R. Miller, Plano, TX (US); William C. Fang, Plano, TX (US)

(73) Assignee: Enseo, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,444

(22) Filed: Mar. 26, 2019

(65) Prior Publication Data
US 2019/0222867 A1 Jul. 18, 2019

Related U.S. Application Data

(63) Continuation of application No. 15/860,509, filed on Jan. 2, 2018, now Pat. No. 10,244,269, which is a continuation of application No. 15/847,247, filed on Dec. 19, 2017, now Pat. No. 10,142,663, which is a continuation of application No. 15/625,416, filed on Jun. 16, 2017, now Pat. No. 9,848,211, which is a continuation of application No. 15/203,515, filed on
(Continued)

(51) Int. Cl.
*H04N 21/214* (2011.01)
*H04N 21/25* (2011.01)
(Continued)

(52) U.S. Cl.
CPC ......... *H04N 21/2143* (2013.01); *H04N 21/25* (2013.01); *H04N 21/4131* (2013.01); *H04N 21/43615* (2013.01); *H04N 21/478* (2013.01); *H04N 21/8126* (2013.01); *H04N 21/8146* (2013.01); *H04W 4/80* (2018.02)

(58) Field of Classification Search
CPC .............. H04N 21/2143; H04N 21/25; H04N 21/4131; H04N 21/43615; H04W 4/80
See application file for complete search history.

(56) References Cited

U.S. PATENT DOCUMENTS

| 5,661,517 A | 8/1997 | Budow et al. |
| 9,088,828 B2 | 7/2015 | Ogle et al. |
| (Continued) | | |

*Primary Examiner* — Sumaiya A Chowdhury
(74) *Attorney, Agent, or Firm* — Scott T. Griggs; Griggs Bergen LLP

(57) ABSTRACT

A set-top box with an interactive portal and system and method for use of the same are disclosed. In one embodiment of the set-top box, the set-top box is deployed to provide an interactive portal in a hospitality establishment having multiple rooms, such as a hotel. The set-top box is associated with a room and includes a housing that secures a television input, a television output, a processor, a transceiver, and memory therein in an interconnected bus architecture. The set-top box generates a default interactive portal as well as a guest-specific interactive portal, which is generated from a guest configuration profile having information including guest identification, a guest channel preference presentation, and a guest service preference presentation with guest account information. The guest configuration profile may also enable the creation of a local area wireless network with substantially the same behavior as the guest's home wireless network.

20 Claims, 4 Drawing Sheets

Related U.S. Application Data

Jul. 6, 2016, now Pat. No. 9,716,902, which is a continuation-in-part of application No. 14/803,428, filed on Jul. 20, 2015, now Pat. No. 9,326,009, which is a continuation of application No. 14/294,123, filed on Jun. 2, 2014, now Pat. No. 9,088,828.

(60) Provisional application No. 62/188,976, filed on Jul. 6, 2015, provisional application No. 61/829,932, filed on May 31, 2013.

(51) Int. Cl.
*H04N 21/478* (2011.01)
*H04N 21/41* (2011.01)
*H04N 21/436* (2011.01)
*H04N 21/81* (2011.01)
*H04W 4/80* (2018.01)

(56) References Cited

U.S. PATENT DOCUMENTS

| | | | |
|---|---|---|---|
| 9,326,009 B2 | 4/2016 | Ogle et al. | |
| 9,848,211 B2 | 12/2017 | Ogle et al. | |
| 10,142,663 B2 | 11/2018 | Ogle et al. | |
| 10,244,269 B2 | 3/2019 | Ogle et al. | |
| 2003/0061077 A1* | 3/2003 | Sagar | G06Q 10/02 705/5 |
| 2004/0019513 A1* | 1/2004 | Colalancia | G06Q 10/02 705/7.15 |
| 2007/0050197 A1* | 3/2007 | Efron | G06Q 10/02 705/26.1 |
| 2008/0319807 A1* | 12/2008 | Weiss | G06Q 10/02 705/5 |
| 2010/0211489 A1* | 8/2010 | Zhang | G06Q 30/02 705/34 |
| 2010/0250707 A1 | 9/2010 | Dalley | |
| 2010/0250717 A1* | 9/2010 | Akagi | H04L 29/12254 709/221 |
| 2011/0238476 A1* | 9/2011 | Carr | H04W 4/029 705/14.25 |
| 2015/0276238 A1* | 10/2015 | Matsuoka | G05B 15/02 700/278 |
| 2016/0286265 A1* | 9/2016 | Watson | H04N 21/43615 |
| 2016/0330488 A1 | 11/2016 | Ogle et al. | |
| 2017/0046650 A1* | 2/2017 | Mulji | G06Q 10/06311 |
| 2017/0289580 A1 | 10/2017 | Ogle et al. | |

\* cited by examiner

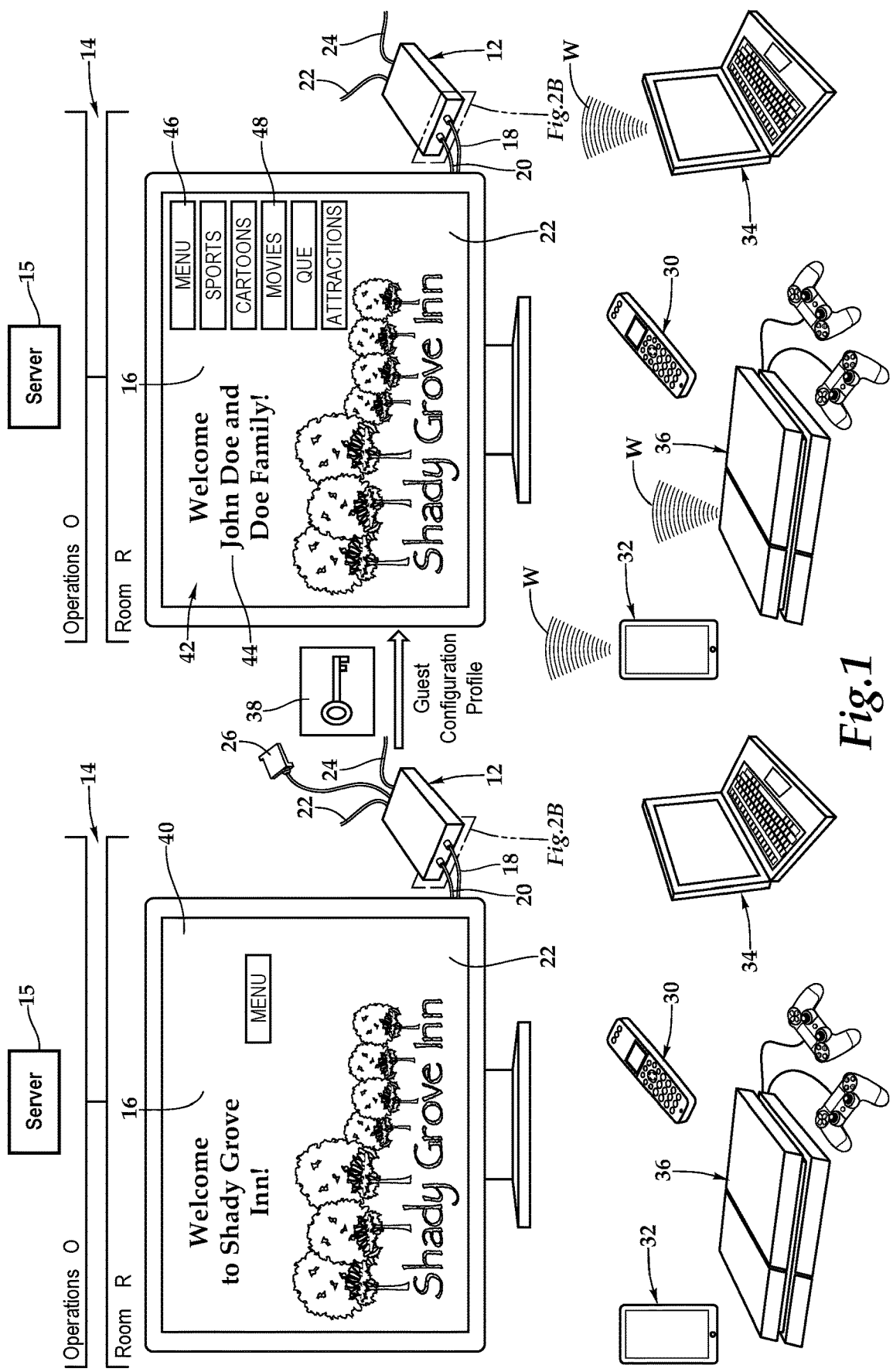

SET-TOP BOX WITH INTERACTIVE PORTAL AND SYSTEM AND METHOD FOR USE OF SAME

PRIORITY STATEMENT & CROSS-REFERENCE TO RELATED APPLICATIONS

This application is a continuation of U.S. patent application Ser. No. 15/860,509 entitled "Set-Top Box with Interactive Portal and System and Method for Use of Same" filed on Jan. 2, 2018, in the names of Vanessa Ogle et al., now U.S. Pat. No. 10,244,269, issued on Mar. 26, 2019; which is a continuation of U.S. patent application Ser. No. 15/847,247 entitled "Set-Top Box with Interactive Portal and System and Method for Use of Same" filed on Dec. 19, 2017, in the names of Vanessa Ogle et al., now U.S. Pat. No. 10,142,663, issued on Nov. 27, 2018; which is a continuation of U.S. patent application Ser. No. 15/625,416 entitled "Set-top Box with Interactive Portal and System and Method for Use of Same" filed on Jun. 16, 2017 in the names of Vanessa Ogle et al., now U.S. Pat. No. 9,848,211, issued on Dec. 19, 2017; which is a continuation of U.S. patent application Ser. No. 15/203,515 entitled "Set-top Box with Interactive Portal and System and Method for Use of Same" filed on Jul. 6, 2016 in the names of Vanessa Ogle et al., now U.S. Pat. No. 9,716,902, issued on Jul. 25, 2017; which claims priority from co-pending U.S. application Ser. No. 62/188,976 entitled "Set-top Box with Interactive Portal and System and Method for Use of Same" and filed on Jul. 6, 2015 in the names of Vanessa Ogle et al.; which are hereby incorporated by reference for all purposes herein. U.S. application Ser. No. 15/203,515 entitled "Set-top Box with Interactive Portal and System and Method for Use of Same" filed on Jul. 6, 2016 in the names of Vanessa Ogle et al., now U.S. Pat. No. 9,716,902, issued on Jul. 25, 2017, is also a continuation-in-part of U.S. patent application Ser. No. 14/803,428 entitled "Set-Top Box with Interactive Portal and System and Method for Use of Same" filed on Jul. 20, 2015 in the names of Vanessa Ogle et al., now U.S. Pat. No. 9,326,009, issued on Apr. 26, 2016; which is a continuation of U.S. patent application Ser. No. 14/294,123 entitled "Set-top Box with Interactive Portal and System and Method for Use of Same" filed on Jun. 2, 2014 in the names of Vanessa Ogle et al., now U.S. Pat. No. 9,088,828, issued on Jul. 21, 2015; which claims priority from U.S. Patent Application Ser. No. 61/829,932 entitled "On-Screen Display" and filed on May 31, 2013 in the name of Vanessa Ogle; all of which are hereby incorporated by reference for all purposes.

TECHNICAL FIELD OF THE INVENTION

This invention relates, in general, to set-top boxes and, in particular, to set-top boxes with interactive portals and systems and methods for use of the same that provide additional functionality to the hospitality lodging industry, as an example.

BACKGROUND OF THE INVENTION

Without limiting the scope of the present invention, the background will be described in relation to the use of smart devices in the hospitality lodging industry, as an example. Making a hotel "a home away from home" is a goal of many hoteliers in the hospitality lodging industry. Hotels are providing more amenities and conveniences than ever for the comfort of patrons in order to offer superior advantages for guests. Traditionally, amenities and conveniences focused on the quality of the room, in-room entertainment, food and beverage service, on-premise amenities such as gyms and spas, and concierge service. With the explosion of the internet, smartphones, and other smart devices, the usability and ease of use of these smart devices at hospitality lodging establishments has become a necessary amenity and convenience. Accordingly, there is a need for improved systems and methods that ensure amenities that provide for the use of smart devices in a hospitality lodging establishment, while providing the convenience and integration into existing and planned hospitality lodging establishments.

SUMMARY OF THE INVENTION

It would be advantageous to introduce systems and methods that further the ensure amenities that provide for the use of proximate wireless-enabled interactive programmable devices in a hospitality lodging establishment. It would also be desirable to enable a computer-based solution that would augment the convenience and integration of a guest-customized experience into existing and planned hospitality lodging establishments. To better address one or more of these concerns, a set-top box with an interactive portal and system and method for use of the same are disclosed. In one embodiment of the set-top box, the set-top box is deployed to provide an interactive portal in a hospitality establishment having multiple rooms, such as a hotel.

The set-top box is associated with a room and includes a housing that secures a television input, a television output, a processor, a transceiver, and memory therein in an interconnected bus architecture. The set-top box generates a default interactive portal as well as a guest-specific interactive portal, which is generated from a guest configuration profile having information including guest identification, a guest channel preference presentation, and a guest service preference presentation with guest account information. In response to receiving the guest configuration profile, a local area wireless network for a guest device may be activated to a network associated with the hospitality establishment. The local area wireless network may have substantially identical behavior to a home wireless network belonging to the guest such that the local area wireless network provides substantially identical network configuration and device, application, and service login credentials as the home wireless network. In another embodiment, a system deploys the set-top boxes in rooms throughout the lodging establishment to provide both a default and the convenience of a guest-specific interactive portal in each room. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic diagram depicting one embodiment of a system for providing a set-top box having a guest configuration profile thereon according to the teachings presented herein;

DETAILED DESCRIPTION OF THE INVENTION

Figure 2A:
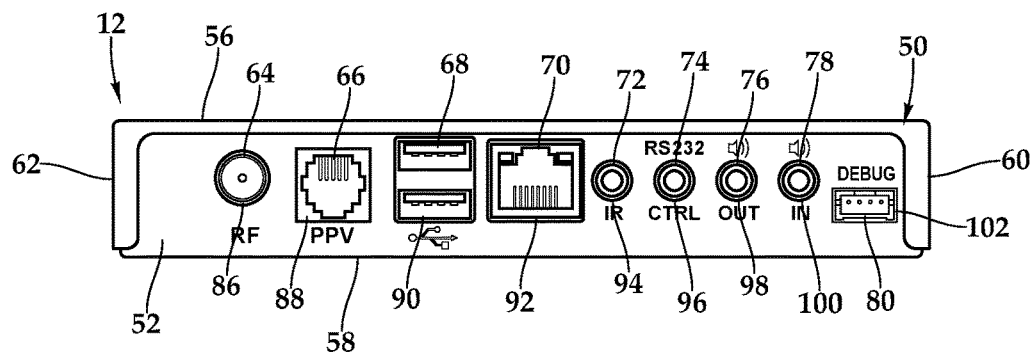
FIG. 2A is a front elevation view of one embodiment of a set-top box depicted in FIG. 1 in further detail.
Figure 2B:
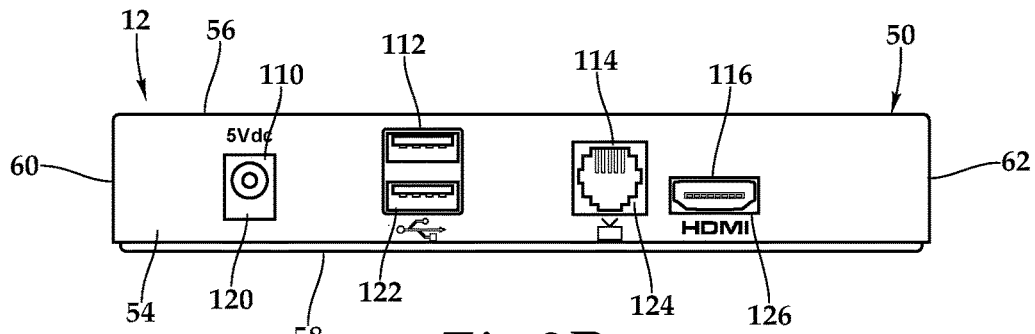
FIG. 2B is a rear elevation view of the set-top box depicted in FIG. 2A.
Figure 2C:
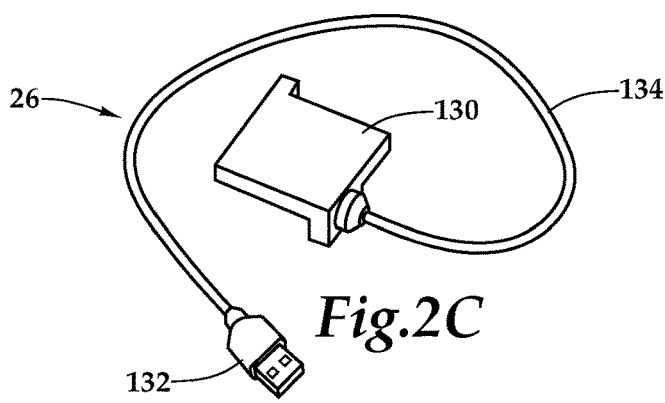
FIG. 2C is a front perspective view of a dongle depicted in FIG. 1 in further detail.
Figure 3:
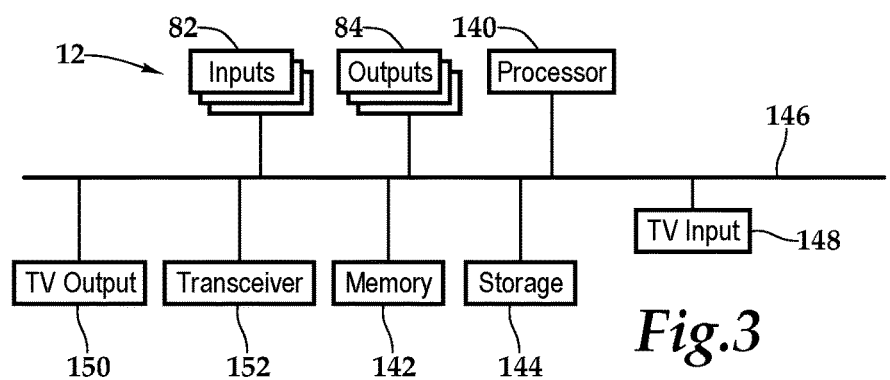
FIG. 3 is a functional block diagram depicting one embodiment of the set-top box presented in FIGS. 2A and 2B.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIGS. 1, therein is depicted one embodiment of a system 10 utilizing set-top boxes 12 with guest-specific interactive portals being employed within a hospitality lodging establishment H. The hospitality lodging establishment or more generally, hospitality property, may be a furnished multi-family residence, dormitory, lodging establishment, hotel, hospital, or other multi-unit environment. As shown, by way of example and not by way of limitation, the hospitality environment is depicted as the hotel H having various rooms, including room R and back of the house operations O. The set-top boxes 12 are communicatively disposed with various amenities associated with the hospitality environment, including televisions 14, which as mentioned is depicted as the hotel H. The set-top boxes 12 may be deployed throughout the rooms R of the hotel H and are in communication with a property server 15, which is co-located at the hotel 14.

As shown, in one embodiment, within a room R, the system 10 includes a set-top box 12 and a display illustrated as television 14 having a screen 16. A connection, which is depicted as an HDMI connection 18, connects the set-top box 12 to the television 14. Other connections include a power cable 20 coupling the set-top box 12 to a power source, a coaxial cable 22 coupling the set-top box 12 to external cable source, and a category five (Cat 5) cable 24 coupling the set-top box 12 to external pay-per-view source at a hotel or other lodging establishment, for example. As shown, the set-top box 12 may include a dongle 26 providing particular technology and functionality extensions thereto. That is, the set-top box 12 may be set-top box-dongle combination in one embodiment. More generally, it should be appreciated that the cabling connected to the set-top box 12 will depend on the environment and application and the cabling connections presented in FIG. 1 are depicted for illustrative purposes. Further, it should be appreciated that the positioning of the set-top box 12 will vary depending on environment and application and, with certain functionality, the set-top box 12 may be placed more discretely behind the television 14.

A television remote control 30 includes an array of buttons for adjusting various settings such as television channel and volume. In one embodiment, the television remote control 30 may be a consumer infrared (IR) or other protocol, such as Bluetooth, device configured as a small wireless handheld object that issues commands from a distance to the set-top box 12 in order to control the television 14 via the set-top box 12, for example. A proximate wireless-enabled interactive programmable device may be a wireless-enabled interactive handheld device that may be supplied or carried by the guest and may be selected from a range of existing devices, such as, for example iPads®, iPhones®, iPod Touch®, Android® devices, Blackberry® devices, personal computers, laptops, tablet computers, smart phones, and smart watches, for example. As will be discussed in further detail below, in one implementation, an application installed from a server enables the set-top box 12 and the proximate wireless-enabled interactive programmable device 32 to be wirelessly paired. In another embodiment, a challenge-response is utilized to wirelessly pair the set-top box 12 and the proximate wireless-enabled interactive programmable device 32. Similar to the proximate wireless-enabled interactive programmable device 32, a personal computer 34 and game console 36 are also depicted in the room R.

As shown, a default interactive portal 40 is displayed on the screen 16, unless a guest configuration profile 38 is loaded within the set-top box 12. The guest configuration profile 38 may be loaded from the operations, e.g., the front desk or hotel headend, by use of the remote control 30, or by a proximate device, such as the proximate wireless-enabled interactive programmable device 32, personal computer 34, or game console 36. In one implementation, as illustrated, the set-top box 12 extends a physical authorization interface, shown as area A, from the set-top box to an area easily accessible to transitory guests' convenience such as in front or side of the television 12. This physical authorization interface A may include a short range wireless data connection that is enabled only when very close physically to the proximate wireless-enabled interactive programmable device 32, for example. Further, once the pairing is established, the set-top box 12 provides a secure wireless interface to communicate transitory guest user device authorization information to the set-top box 12 to accomplish verification. Once authorization information is communicated to the set-top box, the set-top box enables the guest configuration profile.

Enabled, the guest configuration profile 38 provides a customized set-top box experience. More particularly, the guest configuration profile includes guest identification, a guest channel preference presentation, and a guest service preference presentation with guest account information. The guest configuration profile 38 is a guest-specific, guest-customized set-top box generated environment referencing an explicit digital representation of a guest's identity. The set-top box generates a guest interactive portal 42 including a guest indication acknowledgement 44, the guest channel preference presentation 46, and the guest service preference presentation 48, which includes premium programming, game, and music content, for example. Further, personal area network and local area network connectivity is provided to the proximate wireless-enabled interactive programmable device 32, personal computer 34, and game console 36 as shown by the WiFi indicator W.

Referring to FIG. 2A, FIG. 2B, FIG. 2C, and FIG. 3, as used herein, set-top boxes, back boxes and set-top/back boxes may be discussed set-top boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 12 includes a housing 50 having a rear wall 52, front wall 54, top wall 56, bottom base 58, and two sidewalls 60, 62. It should be appreciated that front wall, rear wall, and side wall are relative terms used for descriptive purposes and the orientation and the nomenclature of the walls may vary depending on application. The front wall includes various ports, ports 64, 66, 68, 70, 72, 74, 76, 78, and 80 that provide interfaces for various interfaces, including inputs and outputs. In one implementation, as illustrated, the ports 64 through 80 include inputs 82 and outputs 84 and, more particularly, an Rf input 86, a RJ45 input 88, universal serial bus (USB) input/outputs 90, an Ethernet category 5 (Cat 5) coupling 92, an internal reset 94, an RS232 control 96, an audio out 98, an audio in 100, and a debug/maintenance port 102. The front wall 54 also includes various inputs 82 and outputs 84. More particularly, ports 110, 112, 114, and 116 include a 5V dc power connection 120, USB inputs/outputs 122, an RJ-coupling 124, and an HDMI port 126. It should be appreciated that the configuration of ports may vary with the set-top box depending on application and context. As previously alluded to, the housing 50 may include a housing-dongle combination including, with respect to the dongle 26, a unit 130 having a cable 134 with a set-top box connector 132 for selectively coupling with the set-top box 12.

Within the housing 50, a processor 140, memory 142, storage 144, the inputs 82, and the outputs 84 are interconnected by a bus architecture 146 within a mounting architecture. The processor 140 may process instructions for execution within the computing device, including instructions stored in the memory 142 or in storage 144. The memory 142 stores information within the computing device. In one implementation, the memory 142 is a volatile memory unit or units. In another implementation, the memory 142 is a non-volatile memory unit or units. Storage 144 provides capacity that is capable of providing mass storage for the set-top box 12. Various inputs 82 and outputs 84 provide connections to and from the computing device, wherein the inputs 82 are the signals or data received by the set-top box 12, and the outputs 84 are the signals or data sent from the set-top box 12.

A television content signal input 138 and a television output 150 are also secured in the housing 50 in order to receive content from a source in the hospitality property and forward the content, including external content such as cable and satellite and pay-per-view (PPV) programing, to the television located within the hotel room.

A transceiver 152 is associated with the set-top box 12 and communicatively disposed with the bus 136. As shown the transceiver 152 may be internal, external, or a combination thereof to the housing. Further, the transceiver 152 may be a transmitter/receiver, receiver, or an antenna for example. Communication between various amenities in the hotel room and the set-top box 12 may be enabled by a variety of wireless methodologies employed by the transceiver 152, including 802.11, 3G, 4G, Edge, WiFi, ZigBee, near field communications (NFC), Bluetooth low energy and Bluetooth, for example. Also, infrared (IR) may be utilized.

The memory 142 and storage 144 are accessible to the processor 140 and include processor-executable instructions that, when executed, cause the processor 140 to execute a series of operations. The processor-executable instructions receive a guest configuration profile, which as previously discussed may include guest identification, a guest channel preference presentation, and a guest service preference presentation with guest account information. Also, as previously discussed, the guest configuration profile is a guest-specific, guest-customized set-top box generated environment referencing an explicit digital representation of a guest's identity.

In response to receiving the guest configuration profile at the set-top box 12, the processor-executable instructions cause the processor to temporarily override the default profile and generate a guest interactive portal including a guest indication acknowledgement, the guest channel preference presentation, and the guest service preference presentation. Further, in response to receiving the guest configuration profile, the processor-executable instructions cause the processor to activate a local area wireless connection for a guest device, such as the proximate wireless-enabled interactive programmable device 32, to a network associated with the hospitality establishment. Alternatively, in response to a default profile, the processor-executable instructions cause the processor to generate a default interactive portal prior to forwarding one of the guest interactive portal and the default interactive portal, as appropriate, to the television via the television output. In implementations with multiple set-top boxes disposed in respective multiple rooms, at least one of the set-top boxes will generate a guest interactive portal and at least one of the plurality of set-top boxes will potentially generate a default interactive portal.

Figure 4:
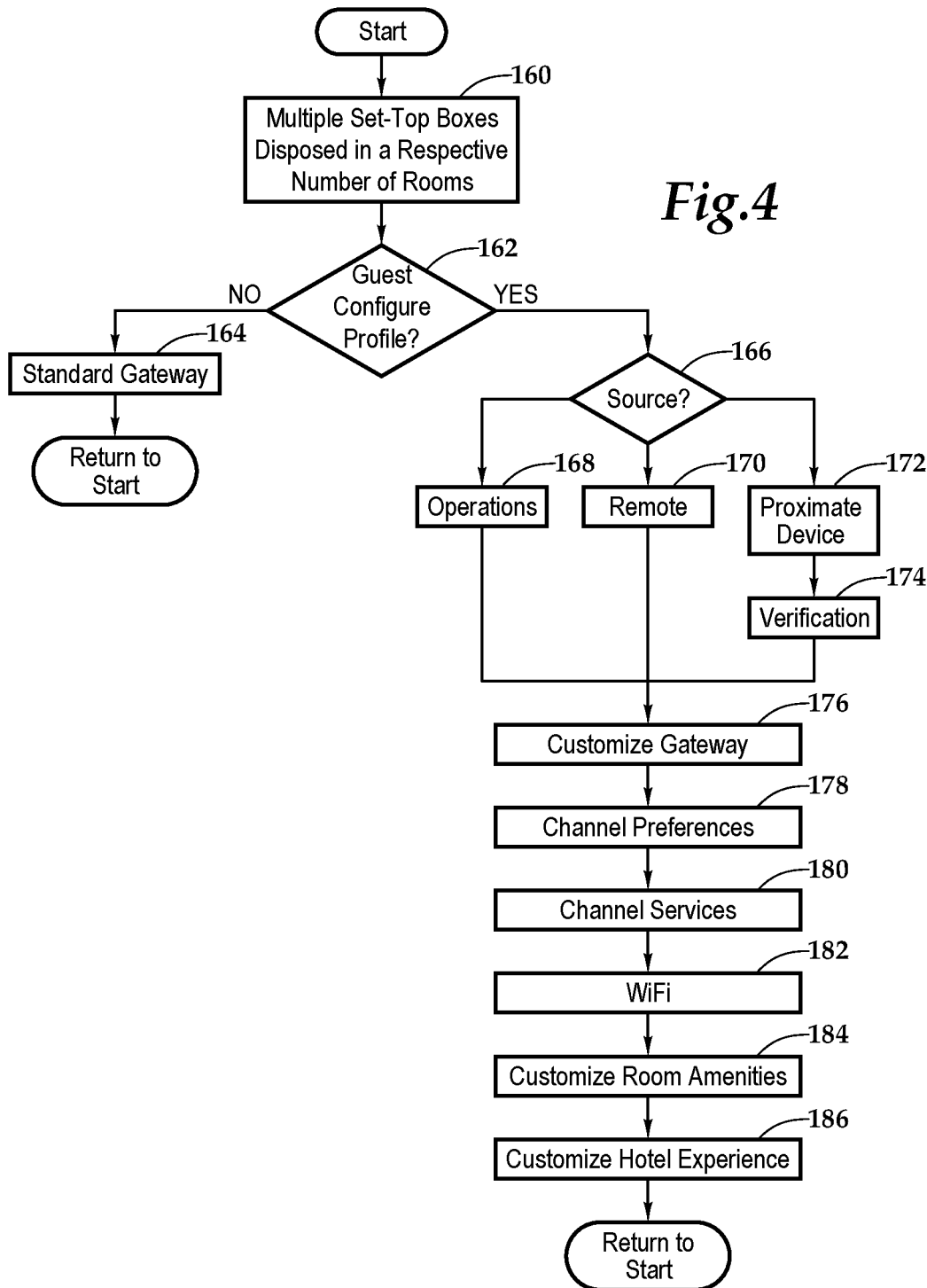
FIG. 4 is a flow chart depicting one embodiment of a method for providing a set-top box having a guest configuration profile thereon according to the teachings presented herein.

Referring now to FIG. 4, a method for using a set-top box with an interactive portal is shown. At block 160, multiple set-top boxes are disposed in a respective number of rooms within a lodging establishment. At decision block 162, if a guest configuration profile is not available then the methodology advances to block 164 where a standard gateway and interactive experience is provided before the method returns to start. On the other hand, if a guest configuration profile is available, then the process advances to decision block 166 where the guest configuration profile is installed from the appropriate source. At block 168, installation is provided from hotel operations, such as a front desk or hotel headend. At block 170, the remote control in the room may provide the guest configuration profile. As a third alternative, at block 172, a proximate wireless-enabled interactive programmable device may be further verified at block 174 and provide the guest configuration profile.

Following blocks 168, 170, and 172-274, the methodology continues to block 176, wherein a customized interactive portal is built based on the guest configuration profile. The customized interactive portal may include the guest's name or similar information. Continuing with blocks 178, 180, 182, 184, and 186, the methodology customizes the channel preferences, channel services, local area network connectivity, e.g., WiFi, for devices, customizes room amenities, and customizes the hotel experience in accordance with the guest configuration profile.

That is, in one implementation, following this methodology, various guest devices, such as the aforementioned proximate wireless-enabled interactive programmable devices and personal computers, may be registered and associated with the set-top box for the purpose of joining personal area networks or local area networks to enable various services on that network requiring authorization.

Figure 5:
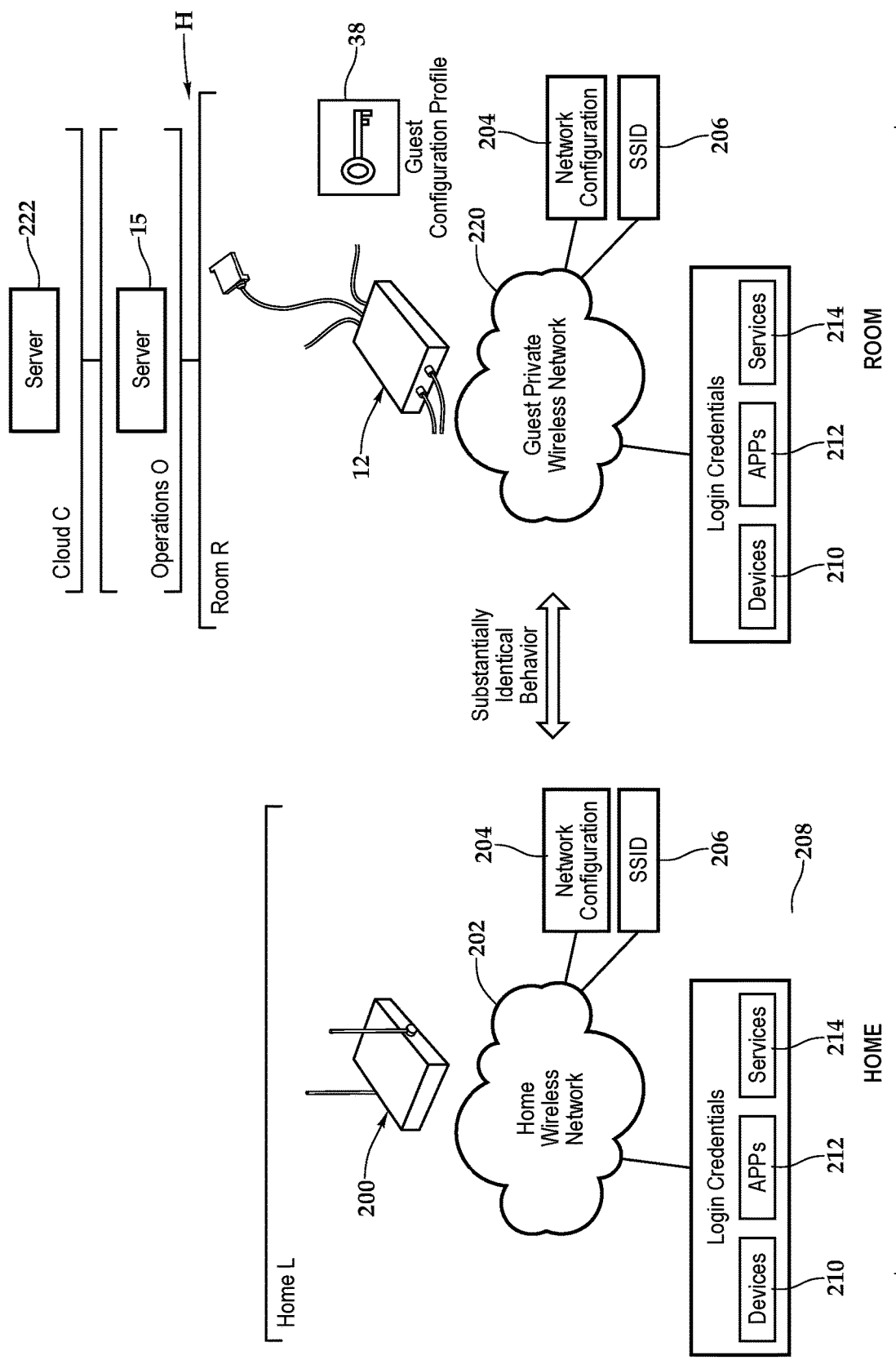
FIG. 5 is a schematic diagram depicting one embodiment of the structure and functionality of the system depicted in FIG. 1.

Referring now to FIG. 5, at a guest's home, a wireless access point 200 provides the networking hardware device, such as router, that allows Wi-Fi compliant devices to connect to a wired network by way of a private wireless network, which is illustrated as home wireless network 202. The home wireless network has a network configuration 204, which provides the network management protocol and mechanisms to install, manipulate, and delete the configuration of various network devices. Such a network configuration may also include a network identification, which is shown as a Service Set Identifier (SSID) 206. In one implementation, the SSID may be a series of 0 to 32 octets that is used as an identifier for the wireless Local Area Network (LAN) and is intended to be unique for the particular home wireless network 202. Various login credentials 208 are also associated with the home wireless network 202. The login credentials 208 may include user names and passwords that permit various devices 210, applications 212, and services 214 to operate over the home wireless network 202. The devices 210 may include the proximate wireless-enabled interactive programmable device 32, the personal computer 34, or the game console 36. The applications 212 may include a computer program designed to perform a group of coordinated functions, tasks, or activities operating on the devices 210 for the benefit of the user, which in this instance is the guest. The services 214 may include various subscription or non-subscription services that provide access to streaming or archived content, such as literature, music, television, and movies, for example. The services 214 may enabled by the devices 210. It should be appreciated that overlap between the devices 210, the applications 212, and the services 214 may exist.

The home wireless network 202 permits the users or guests devices 210, applications 212, and services 214 to work seamlessly at the home L without the need for continuous new configuration. The aforementioned guest configuration profile 38 associated with the set-top box 12 within the room R of the hotel H configures a guest private wireless network 220 that acts as an access point having the same network configuration 204, SSID 206, and login credentials 208 for the devices 210, the applications 212, and the services 214. This creates a home away from home environment for the guest, where all of the guest carry devices, applications, and services, including streaming movie services, work at within the room R as the guest carry devices, applications, and services work at the home wireless network 202 at the home L. In one embodiment, the guest configuration profile 38 provides the guest private wireless network 220 with substantially identical behavior as the home wireless network 202. Therefore, no new configuration is required at the room R. In one implementation, the guest configuration profile 38 may access the information and data necessary to provision the guest private wireless network 220 from the server 15 or a server 22, which may be located offsite or within a cloud C, for example. In operation, in response to receiving the guest configuration profile, a local area wireless network may be activated for a guest device to a network associated with the hospitality establishment. The local area wireless network may have substantially identical behavior to a home wireless network belonging to the guest such that the local area wireless network provides substantially identical network configuration and device, application, and service login credentials as the home wireless network. In particular, the guest configuration profile may enable the creation of a local area wireless network with substantially the same behavior as the guest's home wireless network. As previously alluded, the guest configuration profile 38 not only establishes the guest private wireless network 220, but may also provision room-specific guest preferred features such as room temperature, television lineup, and other amenity preferences.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A set-top box with an interactive portal, the set-top box comprising:
    a housing securing a television input, a television output, a processor, and memory therein;
    a busing architecture communicatively interconnecting the television input, the television output, the transceiver, the processor, and the memory therebetween;
    the television input configured to receive a source signal from an external source, the source signal including a plurality of channels;
    the television output configured to forward a tuned signal to a television, the signal being tuned from the source signal at the set-top box;
    the memory accessible to the processor, the memory including processor-executable instructions that, when executed, cause the processor to:
      receive a guest configuration profile,
      in response to receiving the guest configuration profile, activate a local area wireless network for a guest device;
    the local area wireless network having identical behavior to a home wireless network belonging to the guest, the local area wireless network providing identical network configuration and device and application login credentials as the home wireless network; and
    the guest configuration profile configuring the local area wireless network to be a guest private wireless network that acts as an access point having the same network configuration and login credentials for devices, applications, and services as the home wireless network belonging to the guest, thereby creating a home away from home environment for the guest with provisioning for guest preferred features.

2. The set-top box as recited in claim 1, wherein in response to receiving the guest configuration profile, the memory includes processor-executable instructions that, when executed, cause the processor to activate a local area wireless connection for a guest device to a network associated with the hospitality establishment.

3. The set-top box as recited in claim 1, wherein the services further comprise streaming movie services.

4. The set-top box as recited in claim 1, further comprising an antenna associated with the housing, the antenna being coupled to the busing architecture.

5. The set-top box as recited in claim 4, wherein the wireless signal is selected from the group of wireless protocols consisting of 802.11, 3G, 4G, Edge, WiFi, ZigBee, near field communications (NFC), Bluetooth, and infrared (IR).

6. The set-top box as recited in claim 4, wherein the wireless signal is transmitted to the set-top box from a wireless-enabled interactive handheld device.

7. The set-top box as recited in claim 4, wherein the wireless signal is transmitted to the set-top box from a remote control paired with the set-top box.

8. The set-top box as recited in claim 1, wherein the memory includes processor-executable instructions that, when executed, cause the processor to receive a guest configuration profile via television input.

9. The set-top box as recited in claim 7, wherein the guest configuration profile originates from a hospitality establishment location selected from the front desk and hotel head-end.

10. The set-top box as recited in claim 8, wherein the guest configuration profile further includes control settings for room amenities.

11. The set-top box as recited in claim 1, wherein the guest configuration profile further includes preferences for the lodging establishment experience.

12. A set-top box with an interactive portal, the set-top box comprising:
   a housing securing a television input, a television output, a processor, and memory therein;
   a busing architecture communicatively interconnecting the television input, the television output, the transceiver, the processor, and the memory therebetween;
   the television input configured to receive a source signal from an external source, the source signal including a plurality of channels;
   the television output configured to forward a tuned signal to a television, the signal being tuned from the source signal at the set-top box;
   the memory accessible to the processor, the memory including processor-executable instructions that, when executed, cause the processor to:
      receive a guest configuration profile, and
      in response to receiving the guest configuration profile, activate a local area wireless network for a guest device;
   the local area wireless network having identical behavior to a home wireless network belonging to the guest, the local area wireless network providing identical network configuration and device and application login credentials as the home wireless network; and
   the guest configuration profile configuring the local area wireless network to be a guest private wireless network that acts as an access point having the same network configuration and login credentials for devices, applications, and services as the home wireless network belonging to the guest.

13. The set-top box as recited in claim 12, wherein in response to receiving the guest configuration profile, the memory includes processor-executable instructions that, when executed, cause the processor to activate a local area wireless connection for a guest device to a network associated with the hospitality establishment.

14. The set-top box as recited in claim 12, wherein the services further comprise streaming movie services.

15. The set-top box as recited in claim 12, further comprising an antenna associated with the housing, the antenna being coupled to the busing architecture.

16. The set-top box as recited in claim 15, wherein the wireless signal is selected from the group of wireless protocols consisting of 802.11, 3G, 4G, Edge, WiFi, ZigBee, near field communications (NFC), Bluetooth, and infrared (IR).

17. The set-top box as recited in claim 15, wherein the wireless signal is transmitted to the set-top box from a wireless-enabled interactive handheld device.

18. The set-top box as recited in claim 12, wherein the wireless signal is transmitted to the set-top box from a remote control paired with the set-top box.

19. The set-top box as recited in claim 12, wherein the memory includes processor-executable instructions that, when executed, cause the processor to receive a guest configuration profile via television input.

20. A set-top box with an interactive portal for use a hospitality establishment having a plurality of rooms, the set-top box comprising:
   a housing securing a television input, a television output, a processor, and memory therein, the housing configured to be located in an assigned room of the plurality of rooms;
   a busing architecture communicatively interconnecting the television input, the television output, the transceiver, the processor, and the memory therebetween;
   the television input configured to receive a source signal from an external source, the source signal including a plurality of channels;
   the television output configured to forward a tuned signal to a television in the assigned room, the signal being tuned from the source signal at the set-top box;
   the memory-processor combination associated with the assigned room; and
   the memory accessible to the processor, the memory including processor-executable instructions that, when executed, cause the processor to:
      receive a guest configuration profile, the guest configuration profile including guest identification;
      in response to receiving the guest configuration profile, temporarily override a default profile and generate a guest interactive portal;
      in response to receiving the guest configuration profile, activate a local area wireless network to a network associated with the hospitality establishment;
      the local area wireless network having identical behavior to a home wireless network belonging to the guest, the local area wireless network providing identical network configuration and device and service login credentials as the home wireless network;
      in response to receiving the default profile, generate a default interactive portal;
      forward the guest interactive portal to the television via the television output; and
   the guest configuration profile configuring the local area wireless network to be a guest private wireless network that acts as an access point having the same network configuration and login credentials for devices, applications, and services as the home wireless network belonging to the guest.

* * * * *